(12) United States Patent
Horie

(10) Patent No.: US 6,611,619 B1
(45) Date of Patent: Aug. 26, 2003

(54) IMAGE PROCESSING APPARATUS, IMAGE PROCESSING METHOD, AND RECORDING MEDIUM ON WHICH AN IMAGE PROCESSING PROGRAM IS RECORDED

(75) Inventor: Daisaku Horie, Uji (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/447,290

(22) Filed: Nov. 23, 1999

(30) Foreign Application Priority Data

Nov. 27, 1998 (JP) .......................................... 10-337296

(51) Int. Cl.[7] ................................................ G06K 9/00
(52) U.S. Cl. ........................ 382/165; 382/298; 358/528
(58) Field of Search ................................. 382/162, 167, 382/298 N, 300; 358/515, 528, 451; 348/662, 670

(56) References Cited

U.S. PATENT DOCUMENTS 5,287,204 A * 2/1994 Koizumi et al. ............ 358/538
5,432,869 A * 7/1995 Matsumoto et al. ........ 382/274
5,719,643 A * 2/1998 Nakajima .................... 348/700
5,729,925 A * 3/1998 Okada .................... 375/240.13
5,907,361 A * 5/1999 Okada ........................ 382/154

FOREIGN PATENT DOCUMENTS

JP          09-101771          4/1997

* cited by examiner

Primary Examiner—Jingge Wu
(74) Attorney, Agent, or Firm—Burns, Doane, Swecker & Mathis, LLP

(57) ABSTRACT

An image processing method includes the steps of contracting an original image consisting of plural pixel data to produce a contracted image; comparing a pixel data of the original image with a corresponding pixel data of the contracted image; registering the pixel data of the original image as a registered data if it is judged in the comparing step that a color difference between the pixel data of the original image and the corresponding pixel data of the contracted image is larger than a predetermined value; and substituting the pixel data of the original image with one of a plurality of registered data only if the color difference is not larger than the predetermined value. An apparatus for performing this method is also disclosed.

37 Claims, 14 Drawing Sheets image of low hierarchy — image of high hierarchy before contraction — after contraction before contraction     after contraction

IMAGE PROCESSING APPARATUS, IMAGE PROCESSING METHOD, AND RECORDING MEDIUM ON WHICH AN IMAGE PROCESSING PROGRAM IS RECORDED

CROSS-REFERENCE TO RELATED APPLICATIONS

This application corresponds to Japanese Patent Application No. 10-337296, now, Japanese Patent 2000165662A, filed in Japan on Nov. 27, 1998, the entire contents of which is hereby incorporated herein by reference.

BACKGROUND OF THE INVENTION

1. Field of the Invention

The present invention relates to an image processing apparatus, an image processing method, and a recording medium on which an image processing program is recorded, and particularly, to an image processing apparatus and an image processing method which apply a color subtraction process on an original image, and a recording medium on which an image processing program is recorded.

2. Discussion of Related Art

In the case where image data are to be output, conventionally, the number of colors which can be included in the image data is restricted in accordance with the capability of a display apparatus, a print apparatus, or the like. Therefore, methods of applying a color subtraction process on image data have been proposed. Japanese Patent Publication (Kokai) No. HEI8-263635 discloses a color subtraction method in which, for an image that has been read by an image reading section, the frequency of use of each color data used in the image data is counted to produce a color frequency histogram, and a color data of a higher use frequency is registered as a representative color into a table. Japanese Patent Publication (Kokai) No. HEI8-287752 discloses another color subtraction method in which an RGB color space is uniformly divided, and a representative color is selected on the basis of the frequencies of pixels existing in each of the uniformly divided spaces.

In the above-mentioned color subtraction methods of the prior art, only distribution information of color data in a color space is used. When an uneven color region of a relatively large area exists in an image, the frequency of use of particular color values in pixels belonging to the uneven color region is high, and hence emphasis is placed on such color values. By contrast, in the case where a gradation image region has pixels of many different color data values in a local region, which is small in area as compared with the whole image, the color data of pixels included in the gradation image region have a low frequency of use, and therefore the color data values included in the gradation region may not be selected as a representative color.

This will be described in more detail. FIG. 14 shows an original image in which a bar graph and a local gradation region are drawn. The local gradation region 35 is a region where a photograph or gradation is shown and the degree of change of pixel color values is significant. In the bar graph, the image is solid. As shown in a subregion 37, which is obtained by extracting a part 36 of the bar graph, all pixels included in the subregion 37 have the same color value.

FIG. 15 shows a copy of the original image which is obtained by reading the original image shown in FIG. 14 by a reading apparatus, or the like, as electronic data. When the monochromatic original image is read, as electronic data, color unevenness, noises, and the like which are caused depending on the performance of the reading apparatus are added to the produced electronic data. In the reproduced image of FIG. 15, color unevenness occurs in the bar graph, and hence pixels included in a subregion 38 which is obtained by extracting the part 36 of the bar graph do not always have the same color value.

Also when an original itself includes uneven print portions, an image is obtained in which the pixel color values are dispersed even in a region that is originally desired to have a uniform pixel color value.

FIG. 16 shows pixel values of the original image (FIG. 15) which has been input as electronic data by the reading apparatus or the like, in the form of a histogram. Referring to the figure, the histogram, in which the ordinate indicates the frequency and the abscissa indicates the color value, has four large peaks. In increasing order of the frequency of use of the pixel values, the peaks respectively correspond to the pixel values which are mainly included in characters and lines, those which are mainly included in the bar graph portion, those which are mainly included in the gradation region 35, and those which are mainly included in the background portion. Among the four peaks, the peak indicated by the pixel values which are mainly included in the gradation region 35 shows a very low frequency of use as compared with the other three peaks. This is because the gradation region 35 occupies a small area in the original image as seen from the original image shown in FIG. 15. As the area is smaller, the number of pixels is smaller, and hence the frequency in the histogram shown in FIG. 16 is low.

By contrast, the pixel values included in the bar graph portion show a higher frequency of use, and have a wide width. The frequency of the pixel values is high because the bar graph portion occupies a large area in the original image. The pixel values of the peak indicating the bar graph portion have a wide width because, when the original image is read by a reading apparatus, color unevenness, noises, and the like are added to the image within the range of the width of the pixel values.

A color subtraction method of the prior art uses distribution information of pixel values in a color space such as the histogram shown in FIG. 16. Therefore, emphasis is placed on the pixel values included in the bar graph portion and the background portion which are originally monochromatic and to which a small number of colors should be allocated. In contrast, the gradation region 35 in which the degree of change of a pixel value is significant and to which a large number colors should be allocated has a low frequency. Consequently, emphasis is not placed on the pixel values included in the gradation region 35.

FIG. 17 shows results of a color subtraction process which is performed on the original image of FIG. 15 by using a color subtraction method of the prior art. In a gradation region 35', the gradation is impaired because emphasis is not placed on the pixel values which are to be allocated to that region. By contrast, emphasis is placed on pixel values included in the bar graph portion, and noises and color unevenness remain as they are in the bar graph portion as shown in the subregion 38' which is obtained by extracting the part 36' of the bar graph.

This problem is not restricted to a monochromatic image but occurs also in a color image in the same manner.

A color difference means the degree of a difference in hue or brightness among plural colors, and can be obtained from a color difference formula indicating a distance in a color space such as RGB or HSB.

OBJECTS AND SUMMARY

An object of the present invention is to solve the above-discussed problems.

It is an object of the present invention to provide an image processing apparatus and an image processing method that can perform a color subtraction process for removing color unevenness while maintaining gradation of a region which is small in area compared to an original image, and in which the degree of change of a pixel value is significant. The present invention also includes a recording medium on which an image processing program is recorded.

According to one aspect of the present invention, an image processing apparatus comprises means for contracting a first image having a plurality of pixels to produce at least one contracted image having fewer pixels than the first image; means for comparing each of the pixels of the first image to a corresponding pixel in the contracted image; means for registering the pixel data of the first image as a registered data only if said comparing means judges that a color difference between the pixel data of the first image and the corresponding pixel data of the contracted image is larger than a predetermined value; and means for substituting a pixel data of the first image with one of a plurality of registered data only if said comparing means judges that a color difference between the pixel data of the first image and the corresponding pixel data of the contracted image is not larger than the predetermined value.

DETAILED DESCRIPTION OF THE PREFERRED EMBODIMENTS

Figure 1:
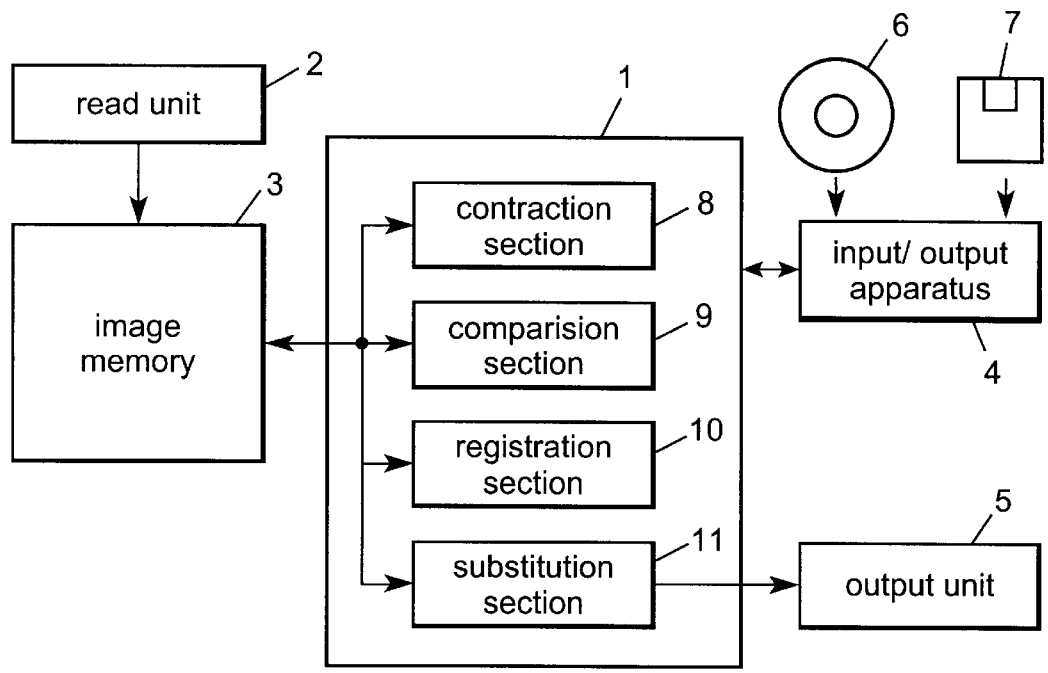
FIG. 1 is a block diagram schematically showing an image processing apparatus according to the present invention.

Hereinafter, an embodiment of the invention will be described with reference the accompanying drawings. In the figures, the same reference numeral indicates the identical or corresponding component.

FIG. 1 is a block diagram schematically showing an image processing apparatus which is a preferred embodiment of the present invention. The image processing apparatus includes: a process unit 1 which applies various processes on image data; a read unit 2 which reads an original image and converts it to electronic data; an image memory 3 which stores the electronic data that is produced by the read unit 2 as well as other information; an input/output apparatus 4 which reads a program for a process in the process unit 1, and which outputs processed data; and an output unit 5 which outputs image data processed by the process unit 1, and which comprises a display apparatus, a printer, or the like. The input/output apparatus 4 can read a program from and write data into a CD-ROM 6 or a floppy disk 7, or any suitable storage medium.

The process unit 1 comprises a contraction section 8 which contracts the original image stored in the image memory 3; a comparison section 9 which compares the image contracted by the contraction section 8 with the original image; a registration section 10 which registers pixel values by temporarily storing the pixel values into the image memory 3 in accordance with an output of the comparison section 9; and a substitution section 11 which substitutes a pixel value of the original image on the basis of pixel values registered by the registration section 10.

The contraction section 8, the comparison section 9, the registration section 10, and the substitution section 11 can independently access the image memory 3.

Figure 2:
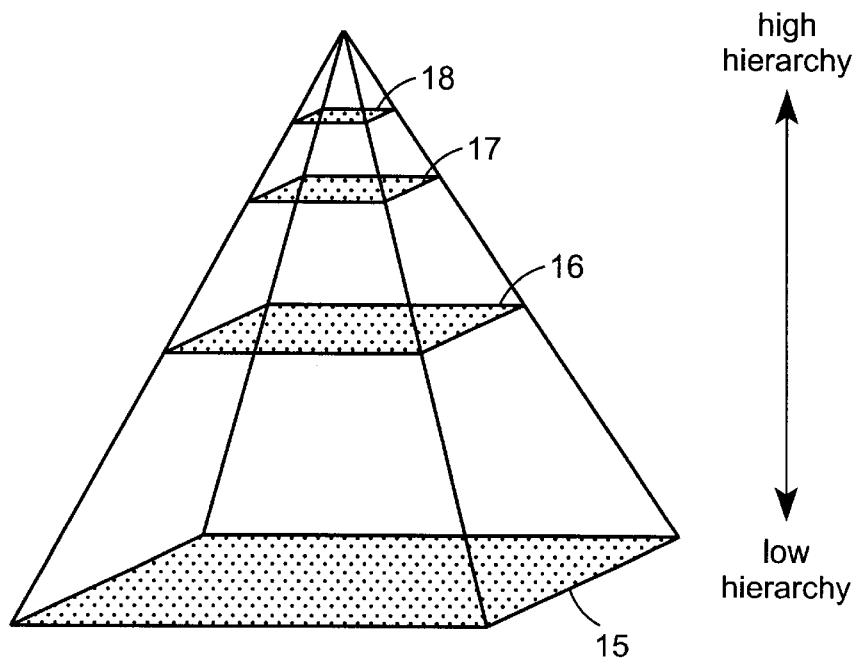
FIG. 2 is a view illustrating a pyramidal image which is used in a color subtraction process to be performed in the image processing apparatus of FIG. 1.

FIG. 2 is a view illustrating a pyramidal image which is used in a color subtraction process to be performed in the image processing apparatus. The pyramidal image includes: an original image 15; a contracted image 16 which is obtained by contracting the original image 15 with a predetermined contraction ratio; a contracted image 17 which is obtained by contracting the original image 15 with a contraction ratio which is smaller than that of the contracted image 16; and a contracted image 18 which is obtained by contracting the original image 15 with a contraction ratio which is smaller than that of the contracted image 17. The pyramidal image is configured so that the hierarchy is lower as moving toward the original image and is higher as moving toward the contracted image 18.

FIG. 3 is a view illustrating relationships among the original image 15 and the contracted images 16, 17, 18. In order to simplify the description, pixel data of the original image 15 are indicated in an arrangement in which sixteen pixels are arranged in both the vertical and horizontal directions. The contraction ratio of the contracted image 16 is 1/4, that of the contracted image 17 is 1/16, and that of the contracted image 18 is 1/64. FIG. 3(A) shows the arrangement of the pixel data of the original image 15, FIG. 3(B) shows the arrangement of the pixel data of the contracted image 16, FIG. 3(C) shows the arrangement of the pixel data of the contracted image 17, and FIG. 3(D) shows the arrangement of the pixel data of the contracted image 18.

Figure 3A:
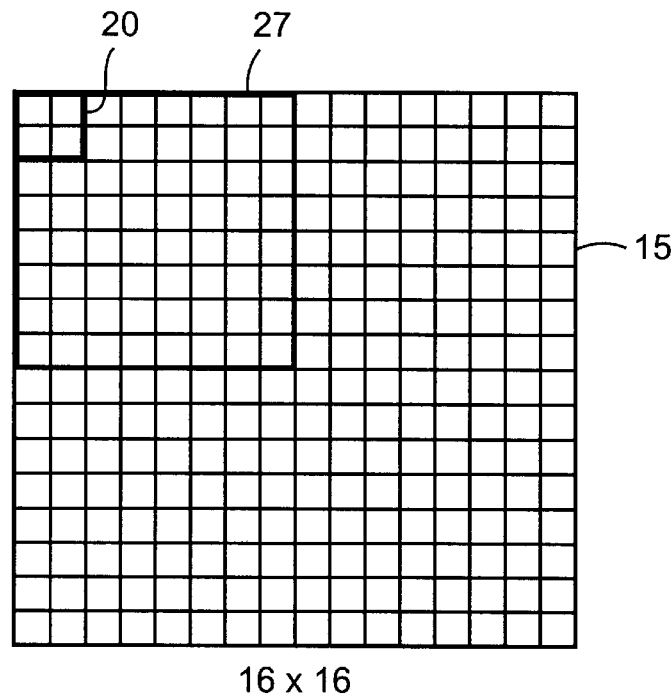
FIG. 3 is a view illustrating relationships among an original image and contracted images in the pyramidal image of FIG. 2.
Figure 3B:
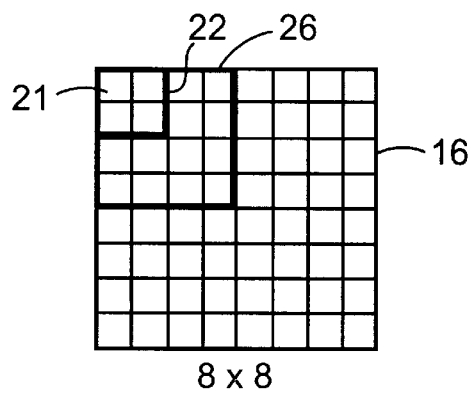
Figure 3C:
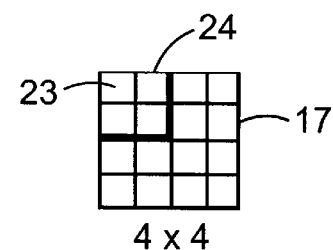
Figure 3D:
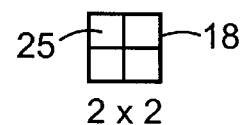

The original image 15 is configured by the arrangement of 16×16 pixel data (FIG. 3(A)), the contracted image 16 is configured by the arrangement of 8×8 pixel data (FIG. 3(B)), the contracted image 17 is configured by the arrangement of 4×4 pixel data (FIG. 3(C)), and the contracted image 18 is configured by the arrangement of 2×2 pixel data (FIG. 3(D)).

In the preferred embodiment, the image processing apparatus performs contraction by repeatedly reducing the number of the pixels of an image by means of resolution conversion due to simple average or the like. For example, the average of the four pixels included in a region 20 shown in FIG. 3(A) is set as pixel 21 shown in FIG. 3(B). Similarly, the average of the pixels included in a region 22 shown in FIG. 3(B) is set as pixel 23 shown in FIG. 3(C), and the average of the four pixels included in a region 24 shown in FIG. 3(C) is set as pixel 25 shown in FIG. 3(D). The pixel 25 shown in FIG. 3(D) is equal to the average of the pixels included in a region 26 shown in FIG. 3(B), and also to that of the pixels included in a region 27 shown in FIG. 3(A). In this way, among the original image 15 and the contracted images 16, 17, 18, the pixel data included in the original image 15 and the contracted images 16, 17, 18 are related to one another.

In the image processing apparatus of the preferred embodiment, contraction is implemented by applying resolution conversion due to simple average or the like, on pixel data. Alternatively, a technique of thinning pixel data may be employed. For example, among the four pixels of the region 20 of the original image 15, the upper left pixel may be set as the value of the pixel 21 of the contracted image 16 so as to remove the remaining three pixels included in the region 20, thereby contracting the original image.

Figure 4:
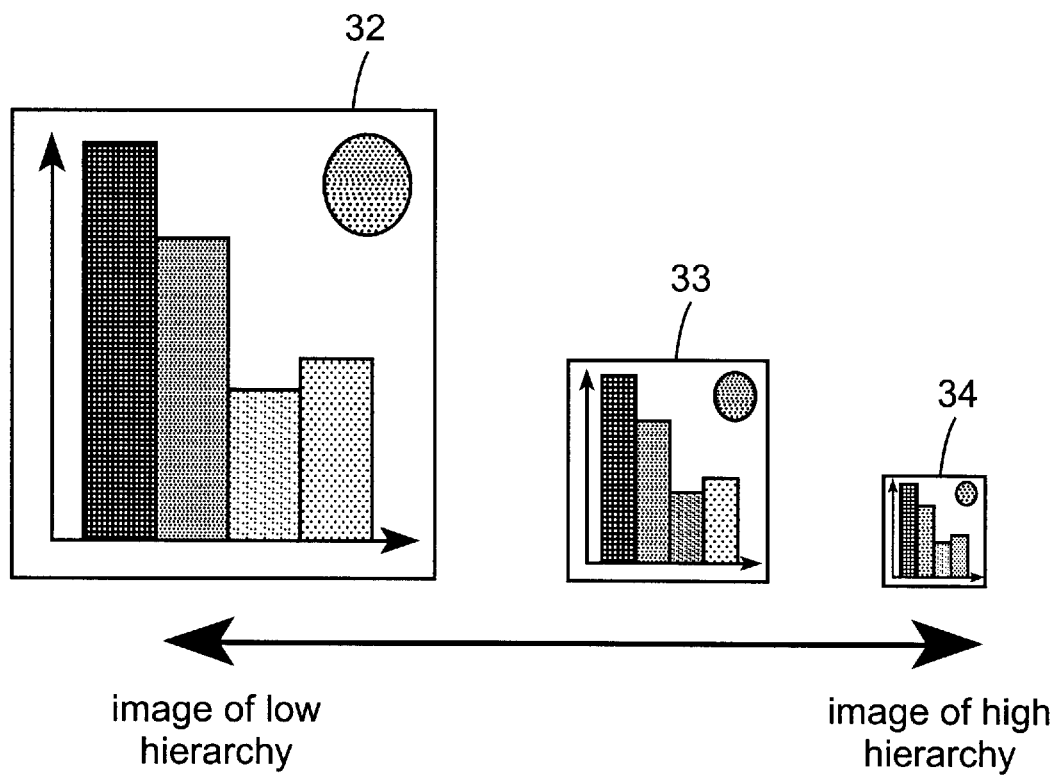
FIG. 4 is a view showing contracted images which are obtained by contracting the original image.
Figure 15:
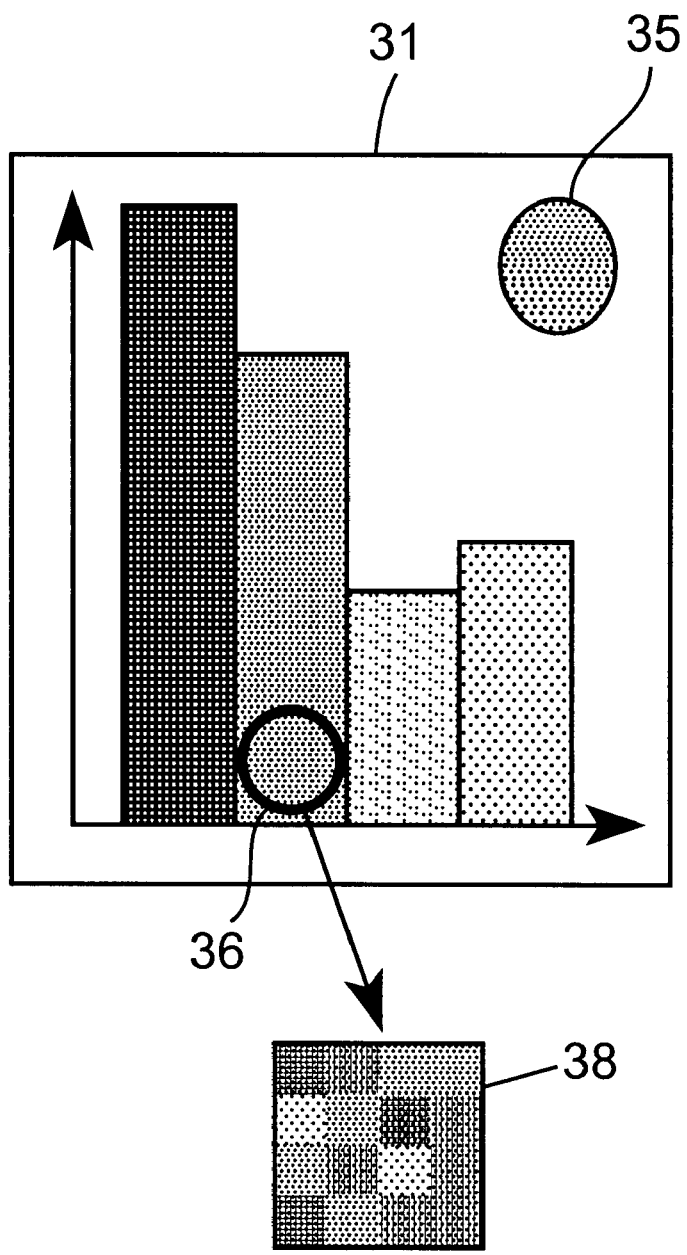
FIG. 15 is a view showing a reproduction of the original image which has been input into a conventional image processing apparatus.
Figure 16:
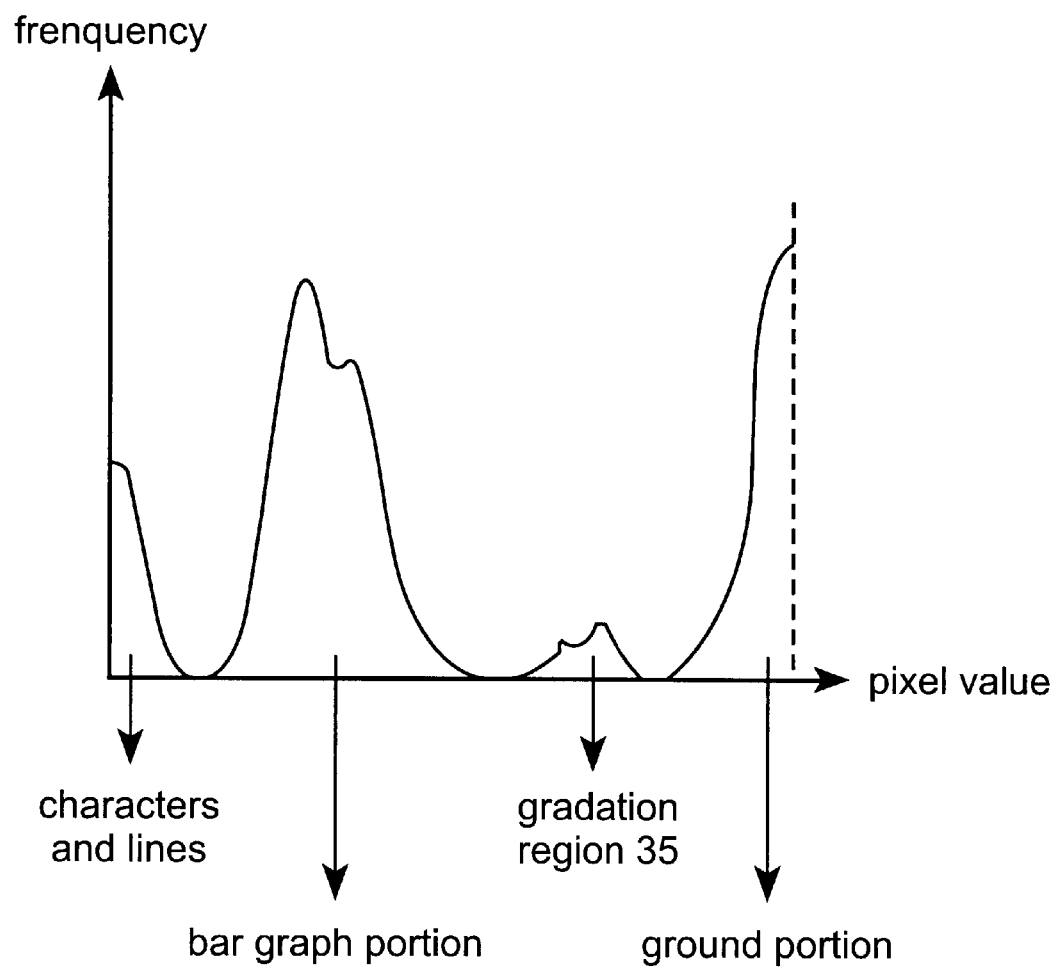
FIG. 16 is a view showing a frequency of each color value in pixel data of the original image.
Figure 17:
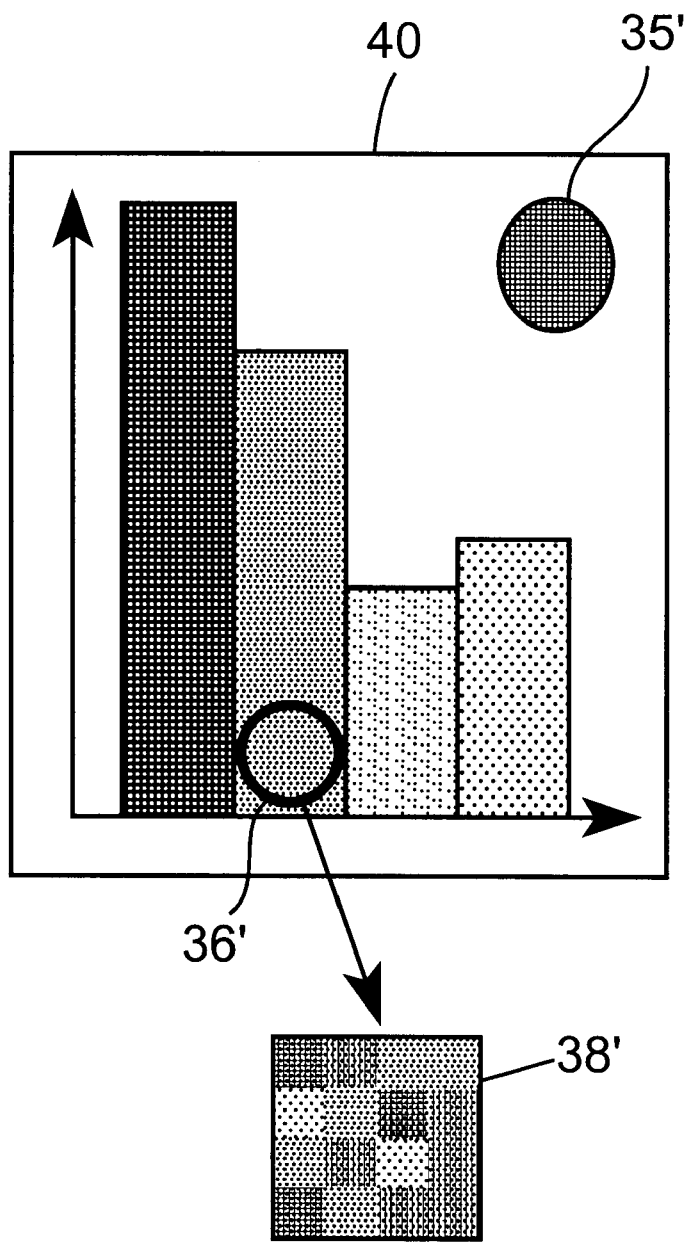
FIG. 17 is a view showing an image which is obtained by performing a color subtraction process on an original image by using a conventional color subtraction method.

FIG. 4 is a view showing contracted images 32, 33, and 34 which are obtained by contracting the reproduction of the original image 31 shown in FIG. 15. In comparison with the pyramidal image of FIG. 2, the original image 15 of the pyramidal image corresponds to the original image 31 of FIG. 15, the contracted image 16 of the pyramidal image corresponds to the contracted image 32 of FIG. 4, the contracted image 17 of the pyramidal image corresponds to the contracted image 33 of FIG. 4, and the contracted image 18 of the pyramidal image corresponds to the contracted image 34 of FIG. 4.

Figure 5:
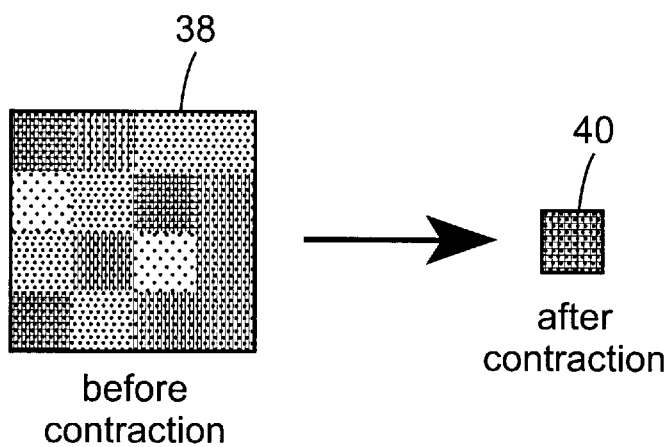
FIG. 5 is a view illustrating relationships between a subregion which is obtained by extracting a part of the original image, and pixel data of a contracted image corresponding to the subregion.

FIG. 5 is a view illustrating relationships between a subregion 38 which is obtained by extracting a part 36 of a bar graph of the original image 31, and pixel data 40 of the contracted image 32 corresponding to the subregion 38. There is substantially no difference in color difference between the pixel data 40 of the contracted image 32 and the pixel data included in the subregion 38 of the original image 31. This is because the differences of the pixel data included in the subregion 38 of the original image 31 are due to color unevenness and noises and hence are not very large.

Figure 6:
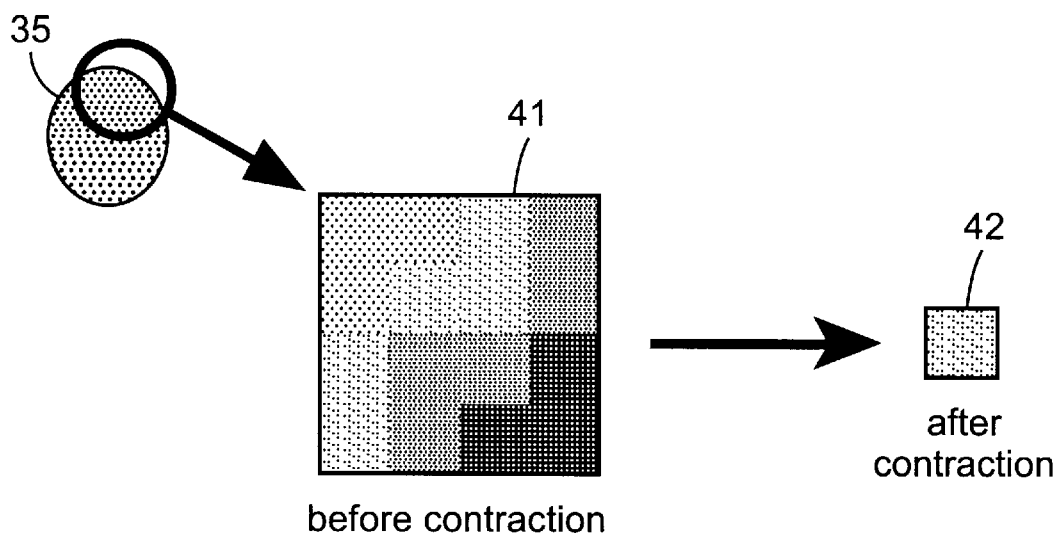
FIG. 6 is a view illustrating relationships between pixel data of a subregion which is a part of a gradation region of the original image, and pixel data of a contracted image corresponding to the subregion.

FIG. 6 is a view illustrating relationships between pixel data of a subregion 41 which is a part of the gradation region 35 of the original image 31, and pixel data 42 of the contracted image 32 corresponding to the subregion 41. The color differences between the pixel data 42 of the contracted image 32 and the pixel data included in the subregion 41 which is a part of the gradation region 35 is dispersed. This is because the gradation region 35 is a region consisting of a photograph or gradation in which a pixel value is intensely changed.

In this way, in the original image 31, the gradation region 35 in which pixel data are intensely changed is different from the subregion 36, in which pixel data are dispersed because of color unevenness, in the degree of color differences between pixel data included in the respective regions. The color differences between pixel data in the gradation region 35 is larger.

Figure 7:
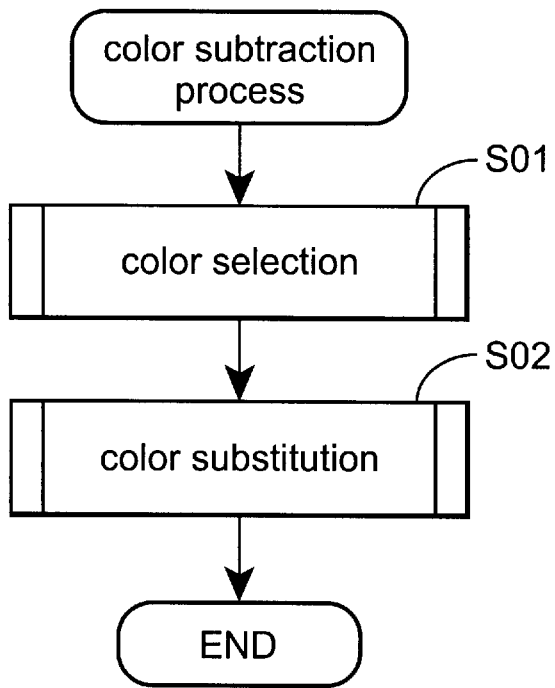
FIG. 7 is a flowchart showing a main flow which is performed in a process unit of the image processing apparatus.
Figure 8:
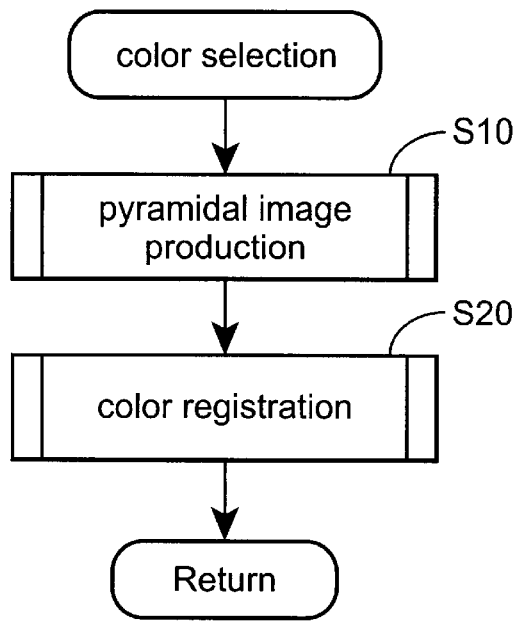
FIG. 8 is a flowchart showing color selection process which is performed in the process unit of the image processing apparatus.

Next, the process which is performed in the process unit 1 of the image processing apparatus will be described. FIG. 7 is a flowchart showing the main color subtraction process which is performed in the process unit 1. The process unit 1 performs a color selection subroutine (step S01) and a color substitution subroutine (step S02). The color selection subroutine is shown in FIG. 8. Namely, a pyramidal image production subroutine (step S10) and a color registration subroutine (step S20) are conducted.

Figure 9:
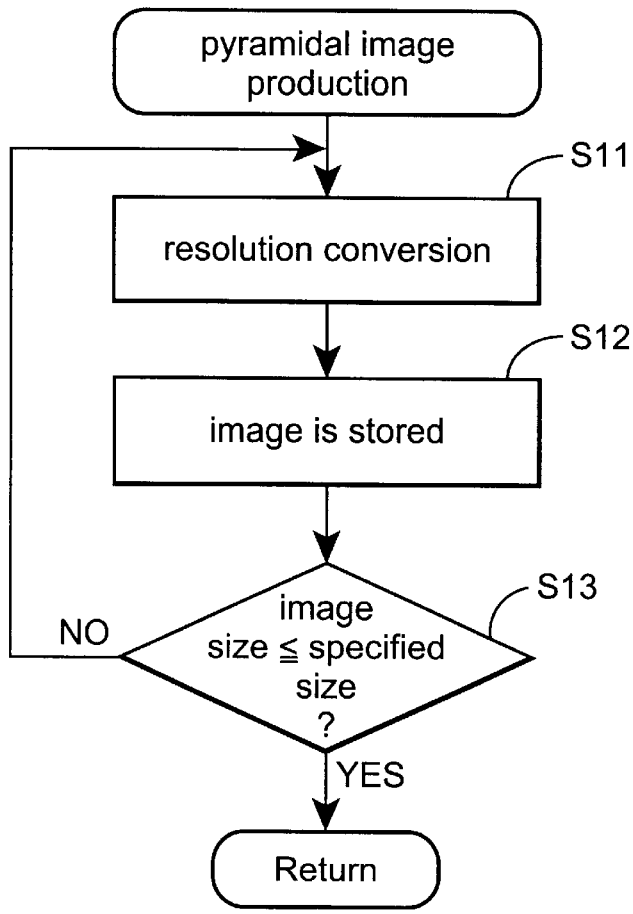
FIG. 9 is a flowchart showing a pyramidal image production process which is performed in a contraction section of the image processing apparatus.

The pyramidal image production process is performed in the contraction section 8 of the process unit 1. FIG. 9 is a flowchart showing the pyramidal image production process which is performed in the contraction section 8. The contraction section 8 performs resolution conversion (contraction) on the original image which has been read by the read unit 2 and which is stored in the image memory 3 (step S11). As a result of this resolution conversion, the original image 31 is contracted into the contracted image 32. The contracted image 32 is stored into the image memory 3 (step S12). Thereafter, it is judged whether the contracted image 32 has a specified size or not (step S13). If the size of the image is larger than the specified one, the procedures of steps S11 and S12 are repeated. If not, the process is ended. The specified size means a size of a contracted image of the smallest contraction ratio in the color subtraction process of the image processing apparatus. In this example, the size of the contracted image 34 is used as the specified size. In other words, the image size coincides with the contraction ratio.

In the pyramidal image production process, therefore, resolution conversion is repeatedly performed on the original image 31 (step S11), so that the contracted images 32, 33, and 34 are stored into the image memory 3 (step S12).

Figure 10:
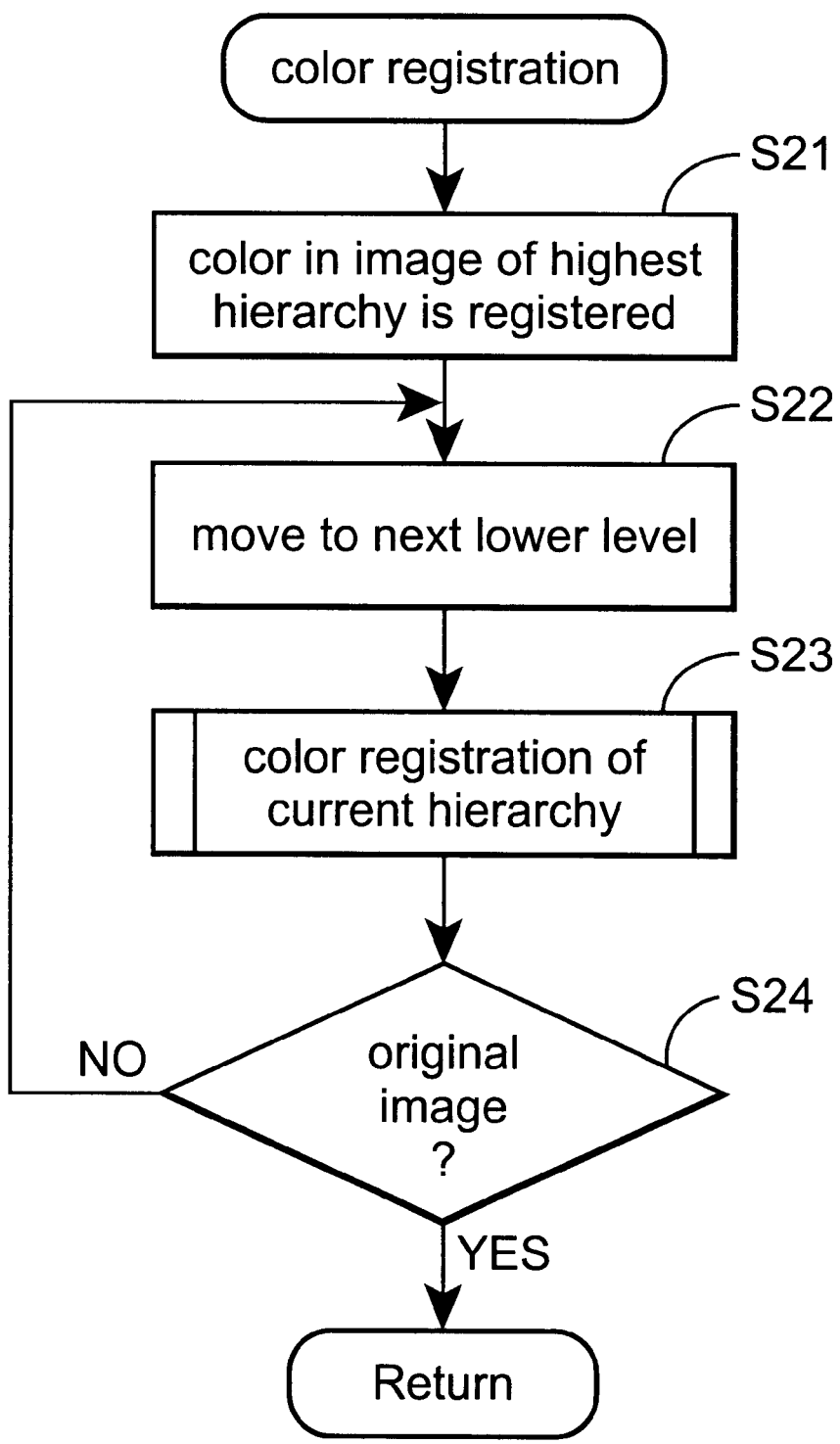
FIG. 10 is a flowchart showing a color registration process which is performed in a comparison section and a registration section of the image processing apparatus.

The color registration subroutine (step S20) shown in FIG. 9 is performed in the comparison section 9 and the registration section 10 of the process unit 1. FIG. 10 is a flowchart showing the color registration process which is performed in the comparison section 9 and the registration section 10. In the color registration process, all of the pixel values included in a hierarchical image of the highest hierarchy are first registered (step S21). The hierarchy depends on the contraction ratio applied on the original image 15. In the case of the pyramidal image of FIG. 2, among the contracted images 16, 17, 18, the contracted image 18 has the smallest contraction ratio and hence is a higher hierarchical image, and the contracted image 15 has the largest contraction ratio and hence is a lower hierarchical image.

In step S21, therefore, all of the pixel values of the contracted image 34 of FIG. 4 (corresponding to the contracted image 18 of the pyramidal image) are registered into the image memory 3. The pixel values of the contracted image 34 are thus registered in step S21 into the memory 3.

Next, the value of each of the pixels of the hierarchy which is lower by one level are read out from the image memory 3 (step S22). In step S22, therefore, the contracted image 33, the hierarchy of which is lower than that of the contracted image 34 by one level, is read out from the image memory 3. Then, the color registration subroutine (step S23) in the current (i.e., lower) hierarchy is performed on the contracted image 34. This will be described in detail later. Thereafter, it is judged in step S24 whether the image of the current hierarchy is the original image or not. The procedures of steps S22 and S23 are repeatedly conducted until it is judged that the image of the current hierarchy is the original image.

As a result, the pixel values of the contracted image 34 are registered into the image memory 3, and, on the basis of the registered pixel values, the color registration subroutine (step S23) in the current hierarchy (which will be described below) is performed on the contracted images 33 and 32 and the original image 31.

Figure 11:
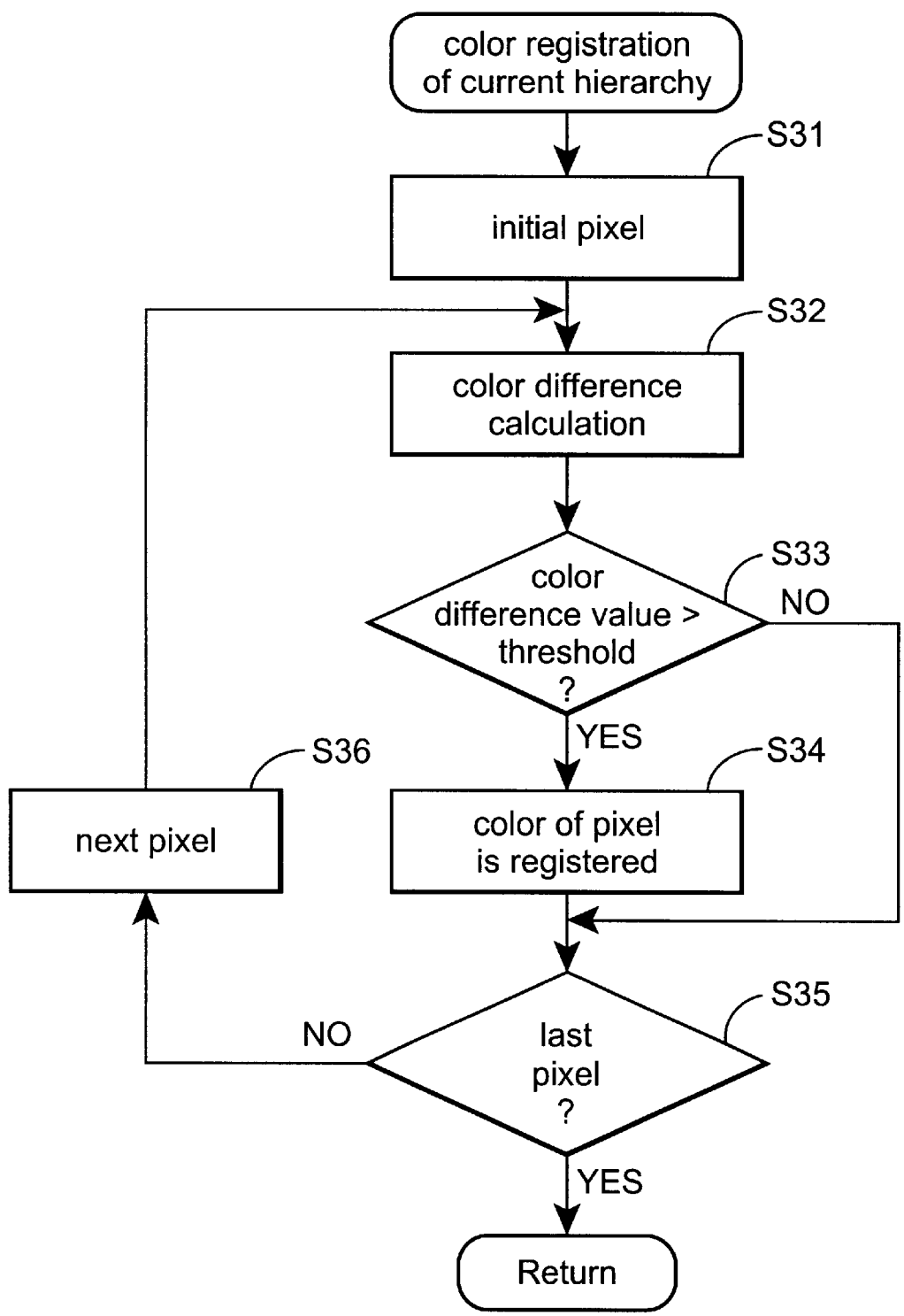
FIG. 11 is a flowchart showing the color registration subroutine in the current hierarchy and in the color registration process.

FIG. 11 is a flowchart showing the color registration subroutine in the current hierarchy which is performed in step S23 of the color registration process shown in FIG. 10. Hereinafter, a process in the case where the image of the current hierarchy is the contracted image 33 will be described. In the color registration subroutine in the current hierarchy, the value of an initial pixel of the contracted image 33 is acquired (step S31). Next, the color difference with respect to the higher hierarchy is calculated (step S32). In this example, the higher hierarchy corresponds to the contracted image 34. The pixel on which the color difference calculation is to be performed is the pixel in the current hierarchy which is the object of the color difference calculation, and that of a higher hierarchy having relations to the pixel. Referring to FIG. 3, the initial pixel which is acquired in step S31 is the pixel 23 shown in FIG. 3(C). The pixel of a higher hierarchy having a relationship to the pixel 23 is the pixel 25 shown in FIG. 3(D). Therefore, the color difference between the pixel 23 shown in FIG. 3(C) and the pixel 25 shown in FIG. 3(D) is calculated.

In the original image and the contracted images shown in FIG. 3, the pixel to be processed corresponds in one to one relationship to those of a higher hierarchy having a relationship to the pixel. Depending on the contraction ratio, one to many relationships may be established. In this case, among color differences between the pixel to be processed and those of a higher hierarchy having relations to the pixel, the smallest color difference is used as the value of color difference.

Returning to FIG. 11, in step S33, the color difference value obtained in step S32 is compared with a threshold which is previously stored in the comparison section 9. If the color difference value is larger than the threshold, the pixel value of the current hierarchy to be processed is newly registered into the image memory 3 (step S34). If the color difference value is not larger than the threshold, the pixel data of the current hierarchy is not registered.

The threshold can be set to any reasonable level based on the results desired. Specifically, the higher the threshold is set, the fewer number of data values will be in the final subtracted image.

Next, it is judged whether the pixel to be processed is the last pixel of the image of the current hierarchy or not (step S35). If the pixel is not the last one, the next pixel is set as the pixel data to be processed (step S36), and the procedures of steps S32 to S34 are repeated. If it is judged in step S35 that the pixel to be processed is the last one, the process is ended and then returns to the color registration process shown in FIG. 10.

In the above-described color registration subroutine in the current hierarchy, the images are processed in the sequence from a higher hierarchical image to a lower one and the original image is finally processed. In the process of the image of each hierarchy, pixel data in which the color difference with respect to the pixel data that has been registered as a result of the process of the higher hierarchy is larger than the threshold are sequentially registered.

In the preferred embodiment, the color difference is calculated in step S32 between related pixel data of different hierarchies. Alternatively, the color difference may be calculated between the pixel to be processed, and all of the pixels of a higher hierarchy, instead of related pixels. In this alternative, among color differences between the pixels to be processed and those of a higher hierarchy, the smallest color difference is used as the value of color difference.

As the color space which is to be subjected to the process and the color difference formula which is to be used in the process, RGB, YUV, and the like, may be used in view of the processing rate and versatility, or Lab, a Hunter color difference formula, a CMC color difference formula, an Adams-Nickerson color difference formula, or the like, may be used in view of accuracy. For a monochromatic image, pixel values may be used as they are without changing the color space.

Figure 12:
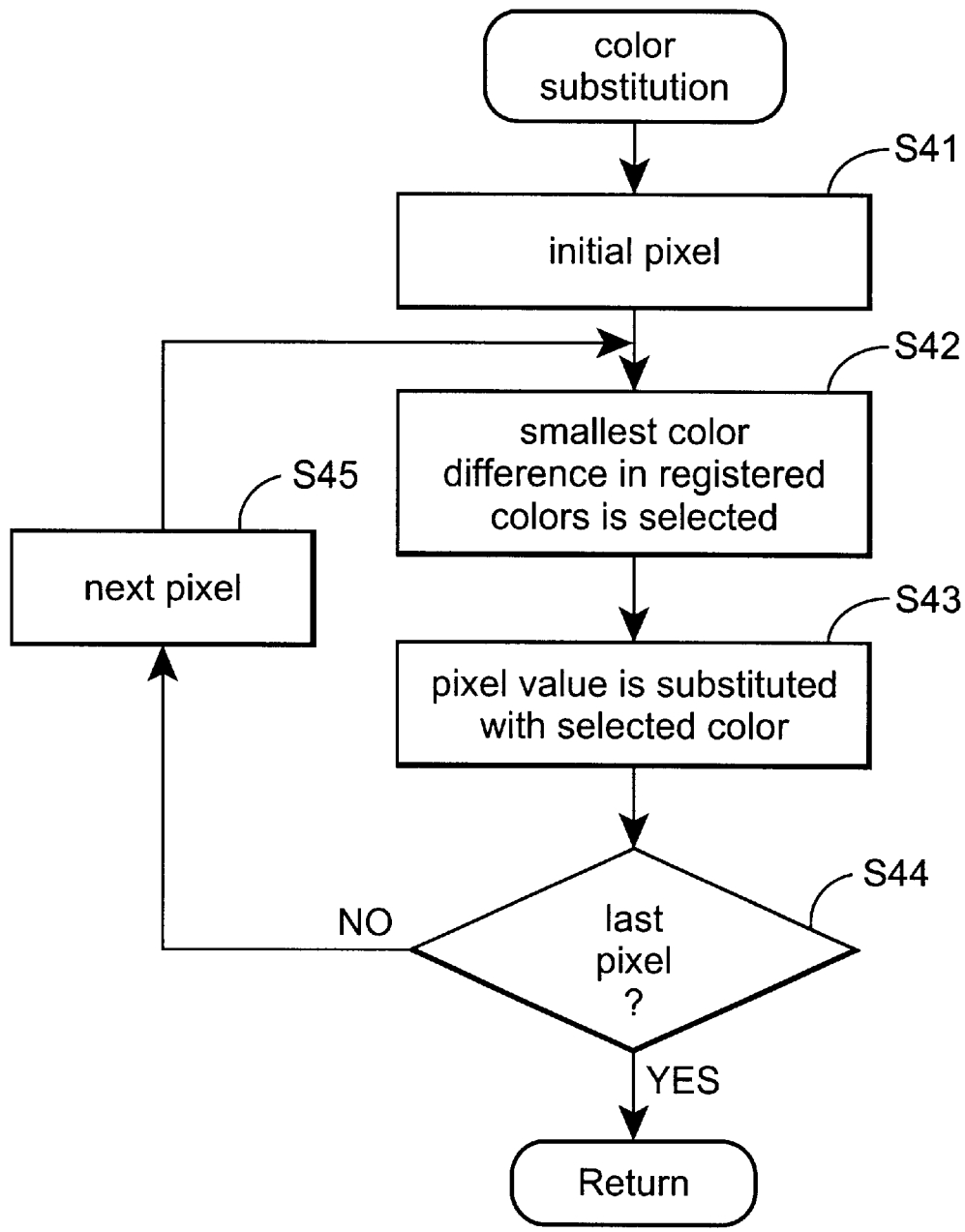
FIG. 12 is a flowchart showing a color substitution process which is performed in a substitution section of the image processing apparatus.

The substitution section 11 of the process unit 1 performs the color substitution process. FIG. 12 is a flowchart showing the flow of the color substitution process which is performed in the substitution section 11. The substitution section 11 acquires a pixel to be processed from the original image 31 (step S41). The data of the pixel to be processed is compared with the pixel data registered in the image memory 3, and, among the registered pixel data, a pixel data of the smallest color difference with respect to the pixel data to be processed is selected (step S42).

Since the pixel data registered in the image memory 3 are stored within a relationship with corresponding pixel data of the original image, the pixel data to be processed is compared not with all the pixel data registered in the image memory 3, but with only the pixel data corresponding to the pixel to be processed, among the pixel data registered in the image memory 3. This will be described specifically. Referring to FIG. 3, when the pixels included in the region 27 shown in FIG. 3(A) are to be processed, pixel data to be compared are those registered in the image memory 3 among those included in the region 26 shown in FIG. 3(B), those included in the region 24 shown in FIG. 3(C), or those included in the region 25 shown in FIG. 3(D).

Next, the data of the pixel to be processed is substituted with the pixel data registered in the image memory 3 which is selected in step S42 (step S43).

Thereafter, it is judged whether the pixel to be processed is the last pixel of the original image or not (step S44). If the pixel is not the last one, the next pixel is set as the pixel to be processed (step S45), and the procedures of steps S42 to S44 are repeated. If the pixel to be processed is the last pixel of the original image, the process is ended and then returns to the color subtraction process shown in FIG. 7.

In step S42, the pixel to be processed is compared with only the pixel data related to the pixel data to be processed, among the pixel data registered in the image memory 3. Alternatively, the pixel to be processed may be compared with all the pixel data registered in the image memory 3.

Figure 13:
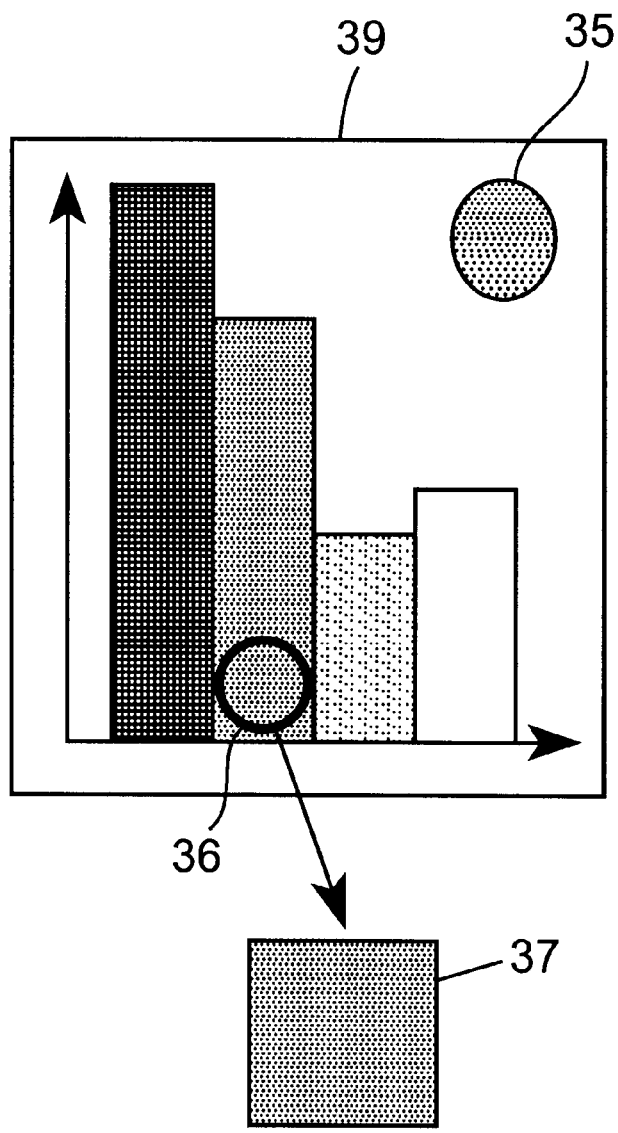
FIG. 13 is a view showing an image which is obtained by applying the color subtraction process on an original image in the image processing apparatus.
Figure 14:
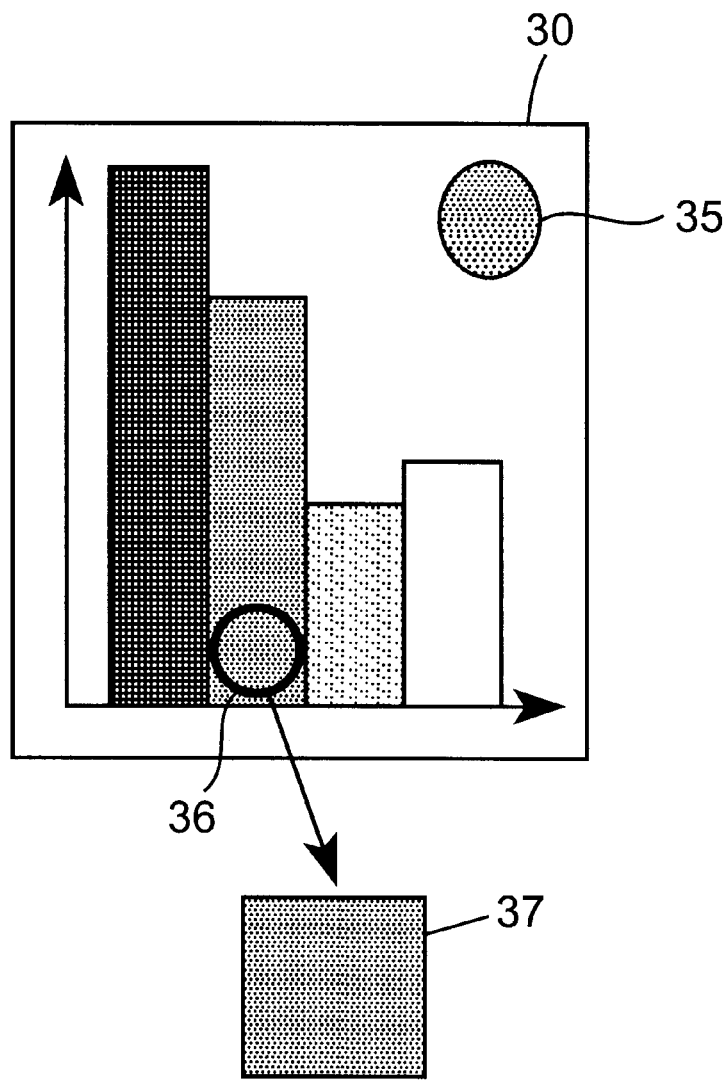
FIG. 14 is a view showing an original image which has not yet been input into an image processing apparatus.

FIG. 13 is a view showing an image which is obtained by applying the color subtraction process on the original image of FIG. 15 in the image processing apparatus of the embodiment. In an image 39 which has undergone the color subtraction process, the degree of change of a pixel value appears in the gradation region 35 of the image 39 in the same manner as the gradation region 35 in the original image 31. In the part 36 of the bar graph in the image 39, as shown in the subregion 37, color unevenness which appears in the part 36 of the bar graph in the original image 31 is removed.

As described above, in the image processing apparatus of the embodiment, the color subtraction process is performed by contracting an original image to form a pyramidal image, performing color registration in the sequence starting from an image of a higher hierarchy, and substituting a pixel data of the original image with a registered pixel data of the smallest color difference with respect to the pixel data. For a region, such as the gradation region 35 in the original image 31, which is small in area as compared with the original image and in which the degree of change of a pixel value is intense, therefore, the color subtraction process can be performed without impairing the degree of change of a pixel value (gradation). Even when color unevenness exists in a region of the bar graph portion of the original image 31, the color unevenness can be removed from the region.

When registration of pixel data and substitution of pixel data are to be performed, a pixel to be processed is compared with pixel data which is related to the pixel data to be processed. Consequently, color selection and color substitution can be performed with placing more emphasis on the position of information which is drawn in the original image 31. Therefore, the above-mentioned effect is attained more clearly.

In preparation of a pyramidal image, the image contraction ratio, the number of hierarchies, or a threshold in the color registration process may have other values, so that the number of colors to be selected, the degree of removal of color unevenness, the rate of the color subtraction process, the required memory capacity, and the like can be changed.

Figure 18:
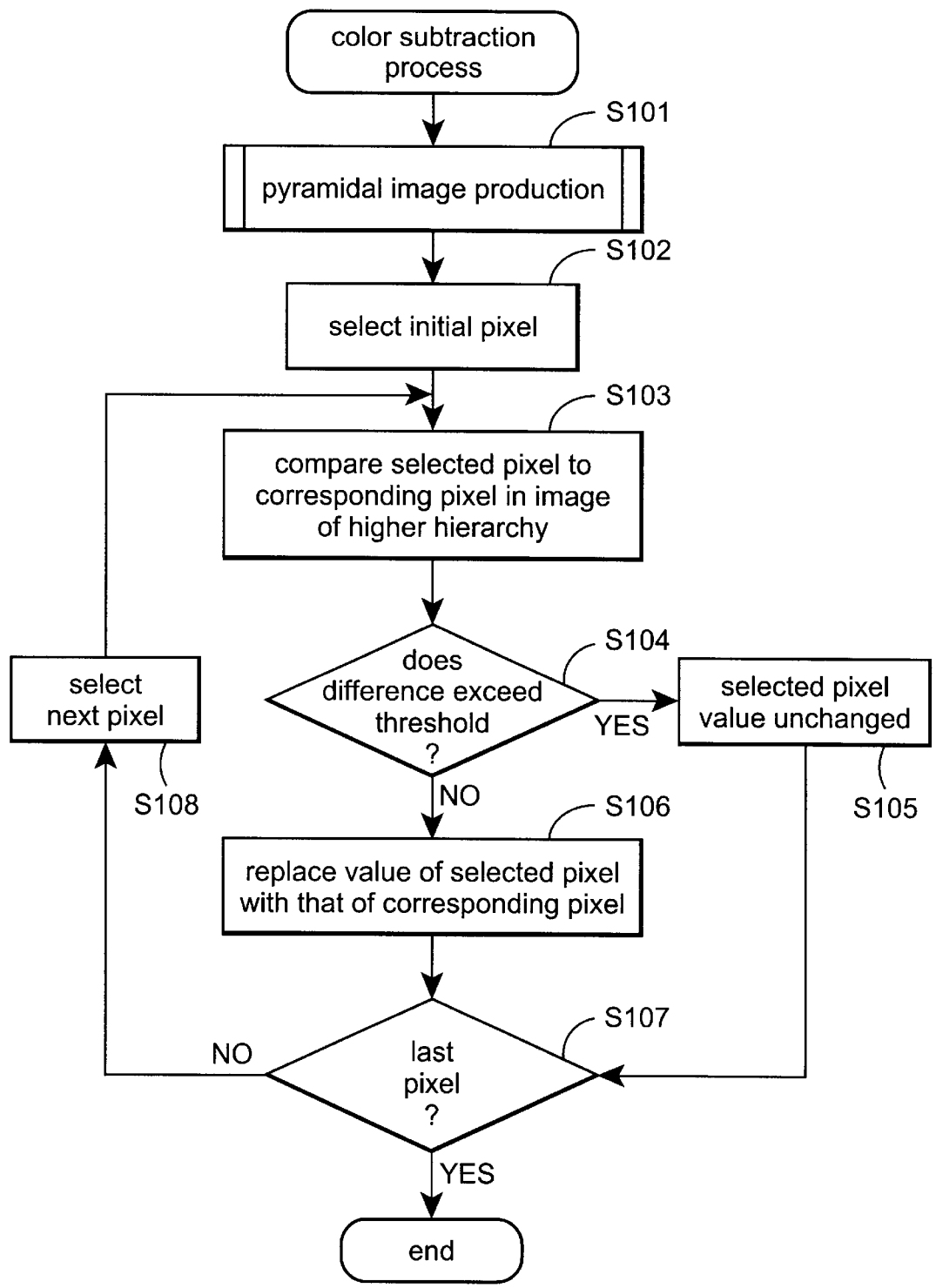
FIG. 18 is a flowchart showing a color subtraction method of an alternative embodiment.

An alternative embodiment of the present invention will now be described. The alternative embodiment is similar to the above described embodiment, except that it omits the registration process. The alternative embodiment will be described with reference to FIG. 18.

In step S101, a pyramidal image production process takes place. Specifically, contracted images of the original image are prepared, as described above in the first embodiment, and in FIG. 9.

In step S102, the initial pixel of the image on which the subtraction process is to be performed is selected. The data value of the selected pixel is then compared to the pixel in the contracted image having a higher hierarchy that corresponds to the initial pixel. Based on this comparison, a color difference determination is made between the selected pixel and the corresponding pixel in the contracted image having a higher hierarchy.

In step S104, the calculated difference is compared to a predetermined threshold. If the calculated difference exceeds the predetermined threshold, the color data value of the selected pixel remains unchanged. See step S105. However, if the calculated difference does not exceed the predetermined threshold, in step S106, the value of the selected pixel is replaced with the value of the corresponding pixel in the contracted image having a higher hierarchy.

It is then determined whether the selected pixel was the last pixel in the image in which the color subtraction process is being performed. See step S107. If the selected pixel is not the last pixel, in step S108, the next pixel in the original image is selected.

Steps S103 through S107 are then repeated until the last pixel is analyzed. After the last pixel is analyze, image processing proceeds as set forth above in the first embodiment.

Although apparatus embodiments have been described, the invention can be grasped also as a color subtraction method in which the color subtraction process that has been described with reference to FIGS. 7 to 12 is performed, and also as a recording medium on which is recorded an image processing program wherein the color subtraction processes that have been described with reference to FIGS. 7 to 12 and 18 are described in the form of a program. In this case, the recording medium on which the image processing program is recorded is a recording medium such as the CD-ROM 6 or the floppy disk 7 shown in FIG. 1, and the image processing program is read out by the input/output apparatus 4 and then implemented by a central processing section of the process unit 1.

It should be understood that the disclosed embodiment is illustrative and not restrictive in all respects. The scope of the invention is defined by the appended claims rather than by the foregoing description, and all changes which fall bounds of the claims, and equivalence of the claims are intended to be embraced by the invention.

What is claimed is:

1. An image processing apparatus, comprising:
   means for contracting a first image having a plurality of pixels to produce at least one contracted image having fewer pixels than the first image;
   means for comparing each of the pixels of the first image to a corresponding pixel in the contracted image;
   means for registering the pixel data of the first image as a registered data only if said comparing means judges that a color difference between the pixel data of the first image and the corresponding pixel data of the contracted image is larger than a predetermined value; and
   means for substituting a pixel data of the first image with one of a plurality of registered data only if said comparing means judges that a color difference between the pixel data of the first image and the corresponding pixel data of the contracted image is not larger than the predetermined value.

2. The image processing apparatus of claim 1, wherein the registering means registers all of the pixel data of the contracted image as registered image data.

3. The image processing apparatus of claim 1, wherein the contracting means uses a simple averaging method to produce the contracted image.

4. The image processing apparatus of claim 1, wherein the contracting means uses a thinning pixel data method to produce the contracted image.

5. The image processing apparatus of claim 1, wherein the one of the plurality of the registered data is the registered data that is closest in value to the pixel data that has been replaced by the one of the plurality of the registered data.

6. The image processing apparatus of claim 1, wherein the corresponding pixel in the contracted image is a pixel in a region that represents a portion of the first image that includes the respective pixel in the first image.

7. The image processing apparatus of claim 6, wherein the corresponding pixel is the only pixel in the region.

8. The image processing apparatus of claim 6, wherein the region includes a plurality of pixels, and the comparing means compares each of the pixels in the first image to the plurality of pixels in the region.

9. The image processing apparatus of claim 1, wherein the comparing means compares each of the pixels of the first image to each of the pixels in the contracted image.

10. An image processing apparatus, comprising:
  means for contracting a first image having a plurality of pixels to produce a contracted image having fewer pixels than the first image;
  means for comparing pixels in the first image to corresponding pixels in the contracted image;
  means for determining if a difference in value between a selected pixel in the first image and a corresponding pixel in the contracted image exceeds a predetermined value; and
  means for replacing a value of the selected pixel with a value of the respective corresponding pixel in the contracted image if the difference between the selected pixel and the respective corresponding pixel does not exceed the predetermined value.

11. The image processing apparatus of claim 10, wherein the contracting means uses a simple averaging method to produce the contracted image.

12. The image processing apparatus of claim 10, wherein the contracting means uses a thinning pixel data method to produce the contracted image.

13. An image processing method comprising the steps of:
  contracting an original image consisting of plural pixel data to produce a contracted image;
  comparing a pixel data of the original image with a corresponding pixel data of the contracted image;
  registering the pixel data of the original image as a registered data if it is judged in the comparing step that a color difference between the pixel data of the original image and the corresponding pixel data of the contracted image is larger than a predetermined value; and
  substituting the pixel data of the original image with one of a plurality of registered data only if the color difference is not larger than the predetermined value.

14. The method of claim 13, wherein the contracting means uses a simple averaging method to produce the contracted image.

15. The method of claim 13, wherein the contracting means uses a thinning pixel data method to produce the contracted image.

16. The method of claim 13, wherein the one of the plurality of the registered data is the registered data that is closest in value to the pixel data that has been replaced by the one of the plurality of the registered data.

17. The method of claim 13, wherein the corresponding pixel in the contracted image is a pixel in a region that represents a portion of the first image that includes the respective pixel in the first image.

18. An image processing method, comprising the steps of:
  contracting a first image having a plurality of pixels to produce a contracted image having fewer pixels than the first image;
  comparing a pixel in the first image to a corresponding pixel in the contracted image;
  determining if a difference in value between the pixel in the first image and the corresponding pixel in the contracted image exceeds a predetermined value;
  replacing a value of the pixel in the first image with a value of the corresponding pixel in the contracted image if the difference between the pixel in the first image and corresponding pixel does not exceed the predetermined value.

19. The method of claim 18, wherein the contracting means uses a simple averaging method to produce the contracted image.

20. The method of claim 18, wherein the contracting means uses a thinning pixel data method to produce the contracted image.

21. The method of claim 18, wherein the one of the plurality of the registered data is the registered data that is closest in value to the pixel data that has been replaced by the one of the plurality of the registered data.

22. The method of claim 18, wherein the corresponding pixel in the contracted image is a pixel in a region that represents a portion of the first image that includes the respective pixel in the first image.

23. The method of claim 18, wherein the comparing step, the determining step, and the replacing step are repeated for each pixel in the original image.

24. The method of claim 18, wherein the one of the plurality of the registered data is the registered data that is closest in value to the pixel data that has been replaced by the one of the plurality of the registered data.

25. A recording medium on which an image processing program is recorded, wherein the image processing program performs the method of claim 13.

26. An image processing apparatus, comprising:
  a contractor for contracting a first image having a plurality of pixels to produce at least one contracted image having fewer pixels than the first image;
  a comparator for comparing each of the pixels of the first image to a corresponding pixel in the contracted image;
  a register for registering the pixel data of the first image as a registered data only if said comparator judges that a color difference between the pixel data of the first image and the corresponding pixel data of the contracted image is larger than a predetermined value; and
  a substituter for substituting a pixel data of the first image with one of a plurality of registered data only if said comparator judges that a color difference between the pixel data of the first image and the corresponding pixel data of the contracted image is not larger than a predetermined value.

27. The image processing apparatus of claim 26, wherein the register registers all of the pixel data of the contracted image as registered image data.

28. The image processing apparatus of claim 26, wherein the contractor uses a simple averaging method to produce the contracted image.

29. The image processing apparatus of claim 26, wherein the contractor uses a thinning pixel data method to produce the contracted image.

30. The image processing apparatus of claim 26, wherein the one of the plurality of the registered data is the registered data that is closest in value to the pixel data that has been replaced by the one of the plurality of the registered data.

31. The image processing apparatus of claim 26, wherein the corresponding pixel in the contracted image is a pixel in a region that represents a portion of the first image that includes the pixel in the first image.

32. The image processing apparatus of claim 31, wherein the corresponding pixel is the only pixel in the region.

33. The image processing apparatus of claim 31, wherein the region includes a plurality of pixels, and the comparator compares each of the pixels in the first image to the plurality of pixels in the region.

34. The image processing apparatus of claim 26, wherein the comparator compares each of the pixels of the first image to each of the pixels in the contracted image.

35. The image processing apparatus, comprising:
  a contractor for contracting a first image having a plurality of pixels to produce a contracted image having fewer pixels than the first image;

a comparator for comparing pixels in the first image to corresponding pixels in the contracted image;

a determiner for determining if a difference in value between a selected pixel in the first image and a corresponding pixel in the contracted image exceeds a predetermined value; and a replacer for replacing a value of the selected pixel with a value of the respective corresponding pixel in the contracted image if the difference between the selected pixel and the respective corresponding pixel does not exceed the predetermined value.

36. The image processing apparatus of claim 35, wherein the contractor uses a simple averaging method to produce the contracted image.

37. The image processing apparatus of claim 35, wherein the contractor uses a thinning pixel data method to produce the contracted image.

* * * * *